United States Patent
Lebert

(10) Patent No.: US 9,612,808 B1
(45) Date of Patent: Apr. 4, 2017

(54) MEMORY USE FOR STRING OBJECT CREATION

(71) Applicant: INTERNATIONAL BUSINESS MACHINES CORPORATION, Armonk, NY (US)

(72) Inventor: Berthold M. Lebert, Phoenix, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/053,550

(22) Filed: Feb. 25, 2016

(51) Int. Cl.
*G06F 9/44* (2006.01)
*G06F 9/00* (2006.01)
*G06F 9/45* (2006.01)

(52) U.S. Cl.
CPC .................... *G06F 8/443* (2013.01)

(58) Field of Classification Search
CPC .... G06F 8/20; G06F 8/33–8/36; G06F 8/443; G06F 8/71; G06F 8/4441
See application file for complete search history.

(56) References Cited

U.S. PATENT DOCUMENTS

| | | | | |
|---|---|---|---|---|
| 6,523,168 B1* | 2/2003 | Arnold | .................. | G06F 8/4441 717/116 |
| 6,658,652 B1* | 12/2003 | Alexander, III | ...... | G06F 9/5016 707/999.202 |
| 6,971,091 B1* | 11/2005 | Arnold | .................... | G06F 8/443 717/130 |
| 7,617,504 B1* | 11/2009 | Hill | ........................ | G06F 9/548 709/213 |
| 7,788,384 B1* | 8/2010 | Rubinstein | .......... | H04L 65/1069 709/227 |
| 8,099,723 B2 | 1/2012 | Burka et al. | | |
| 8,443,352 B2* | 5/2013 | Tatsubori | ................ | G06F 8/437 717/114 |
| 8,473,902 B2 | 6/2013 | Davies et al. | | |
| 8,510,710 B2 | 8/2013 | Harren et al. | | |
| 8,639,743 B1 | 1/2014 | Colton et al. | | |
| 8,839,215 B2 | 9/2014 | Hrischuk et al. | | |
| 8,972,960 B2 | 3/2015 | Brauneis et al. | | |
| 9,110,680 B1 | 8/2015 | Boynes | | |

(Continued)

OTHER PUBLICATIONS

Haubl et al., Optimized strings for the Java HotSpot™ virtual machine, Sep. 2008, 10 pages.*

(Continued)

*Primary Examiner* — Thuy Dao
(74) *Attorney, Agent, or Firm* — Patents on Demand P.A.; Brian K. Buchheit; Scott M. Garrett

(57) ABSTRACT

Conventionally compiled byte code, such as that produced by compiling Java source code, contains calls to string buffer creation methods. The compiled byte code is processed by a machined that performs an optimizer tool. The optimizer tool refactors the compiled byte code to produce a modified byte code that is functionally equivalent to the compiled byte code with respect to string creation, but which creates fewer string buffer and character array objects to accomplish that string creation. The optimizer tool replaces a call to build a new string buffer object with a call to an existing string buffer object and code setting length of the existing string buffer object to zero and appending new string characters this existing string buffer object.

1 Claim, 3 Drawing Sheets

(56) References Cited

U.S. PATENT DOCUMENTS

| | | | |
|---|---|---|---|
| 2008/0147955 A1* | 6/2008 | Lagergren | G06F 9/45504 711/6 |
| 2009/0187896 A1* | 7/2009 | Ogasawara | G06F 8/443 717/152 |
| 2010/0088675 A1* | 4/2010 | Harren | G06F 9/5016 717/118 |

OTHER PUBLICATIONS

Li et al., String analysis for Java and Android applications, Sep. 2015, 12 pages.*
Bhattacharya, Suparna, et al., "Reuse, Recycle to De-Bloat Software," ECOOP 2011—Object-Oriented Programming, Springer Berlin Heidelberg, 2011, pp. 408-432.

* cited by examiner

MEMORY USE FOR STRING OBJECT CREATION

BACKGROUND

The present disclosure relates generally to optimizing software, and more particularly to identifying calls in compiled interpreted source code to create memory objects and replacing those calls with calls the reduce the number of objects created.

One of the most important developments in software design has been portable code which allows a developer to write an application in a common language which is then converted into byte code. Java is an example of a popular language that produced byte code. The byte code can be deployed on different machines that have different resources and operating systems by use of a virtual machine environment on those different machines. The byte code is processed by the virtual machine which interacts with the local operating system in the execution of the code to achieve the intended result. During execution, memory resources are managed as needed to allow operation of the code. Managing memory is critically important to the performance and reliability of a data processing system such as a computer. Specifically, data used by a computer program is typically stored in a computer within a memory that has a limited address space. In many computers, data is stored in the form of "objects" that are allocated space in a portion of the memory referred to as an "object heap".

In many computer environments, objects are created, or "allocated", dynamically (i.e., on an as-needed basis) during the execution of a computer program. In addition, given that the amount of memory available in a computer is limited, some mechanism for removing, or "deallocating", unused objects is also provided, typically either through the use of specific program instructions or through an automated process known as garbage collection. One well known computer programming environment that utilizes dynamic memory allocation, for example, is the Java programming environment developed originally by Sun Microsystems, the trademark for which is now owned by Oracle Corp.

One primary benefit of dynamic memory allocation is that the overall amount of memory required to run a computer program is typically reduced, often reducing the memory requirements of a computer upon which the program is executed, or permitting more computer programs to share a given memory space in the computer. Computer performance may also benefit due to the reduced memory requirements, since less swapping of data into and out of memory may be required. Another benefit is that overall reliability of the computer is often improved since memory usage is typically better managed.

The primary drawback to dynamic memory management, however, is the additional "overhead" that is associated with both allocating and deallocating objects. Allocating and deallocating an object each require the computer to perform certain operations that are outside of the actual productive operations that are being performed during execution of a computer program. These additional operations delay the performance of the productive operations, which typically slows the overall operation of the computer. Therefore, for performance concerns, it is highly desirable to minimize whenever possible the number of object allocation and deallocation operations performed by a computer program.

The overhead associated with object allocation and deallocation is of particular concern with respect to computer operations that rely on "temporary" data storage. In particular, with objects that are used repeatedly over a significant period of time, the overhead associated with allocating and deallocating those objects becomes relatively insignificant compared to the productive operations that are performed with those objects. In contrast, whenever objects are only used for a brief period of time, the overhead associated with allocating and then deallocating the objects becomes more significant relative to the productive operations performed with those objects. Furthermore, although the overhead associated with each allocation and deallocation may be relatively minor, when the effects of a large number of operations that rely on temporary objects are considered, the collective impact on overall computer performance can be substantial.

A skilled computer programmer can in some instances reduce the number of object allocation and deallocation operations in a computer program during development of the computer program. In other instances, however, the programmer may not be able to control when some objects are allocated and/or deallocated. For example, a programmer writing a computer program in a source code, or human-readable format, may need to use certain instructions that, when translated into a machine-readable or intermediate format, inherently result in the creation of temporary objects due to the design of the particular translation program (e.g., a compiler or interpreter) used to translate the computer program to the machine-readable or intermediate format.

One such example is a string concatenation operation in the Java programming environment. A string concatenation operation, which is designated by the "+" operator in Java, creates a new string from the two objects identified as arguments to the operation. For example, the concatenation of a first string such as "start" with a second string such as "le" would result in the creation of a new string "startle".

Compilation of a string concatenation statement in a Java source code program by a Java compiler results in the generation of program code that utilizes a temporary mutable string object, known in Java as a "StringBuffer" object (java.lang.StringBuffer or the unsynchronized equivalent java.lang.StringBuilder which was introduced in Java 5), in performing the string concatenation operation. In addition, other objects are created as well, including a character array for each string buffer object, a String object that gets passed as an argument, and a character array for each String object. Most of these objects are used only once, and in a iterative process of string concatenation, each iteration results in additional one-time only use objects being created. All of these objects persist until a garbage collection operation is performed, which can restrict memory resources until the garbage collection occurs.

Accordingly, there is a need for a way to perform string concatenations without creating so many one-time use string objects.

BRIEF DESCRIPTION OF THE DRAWINGS

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1:
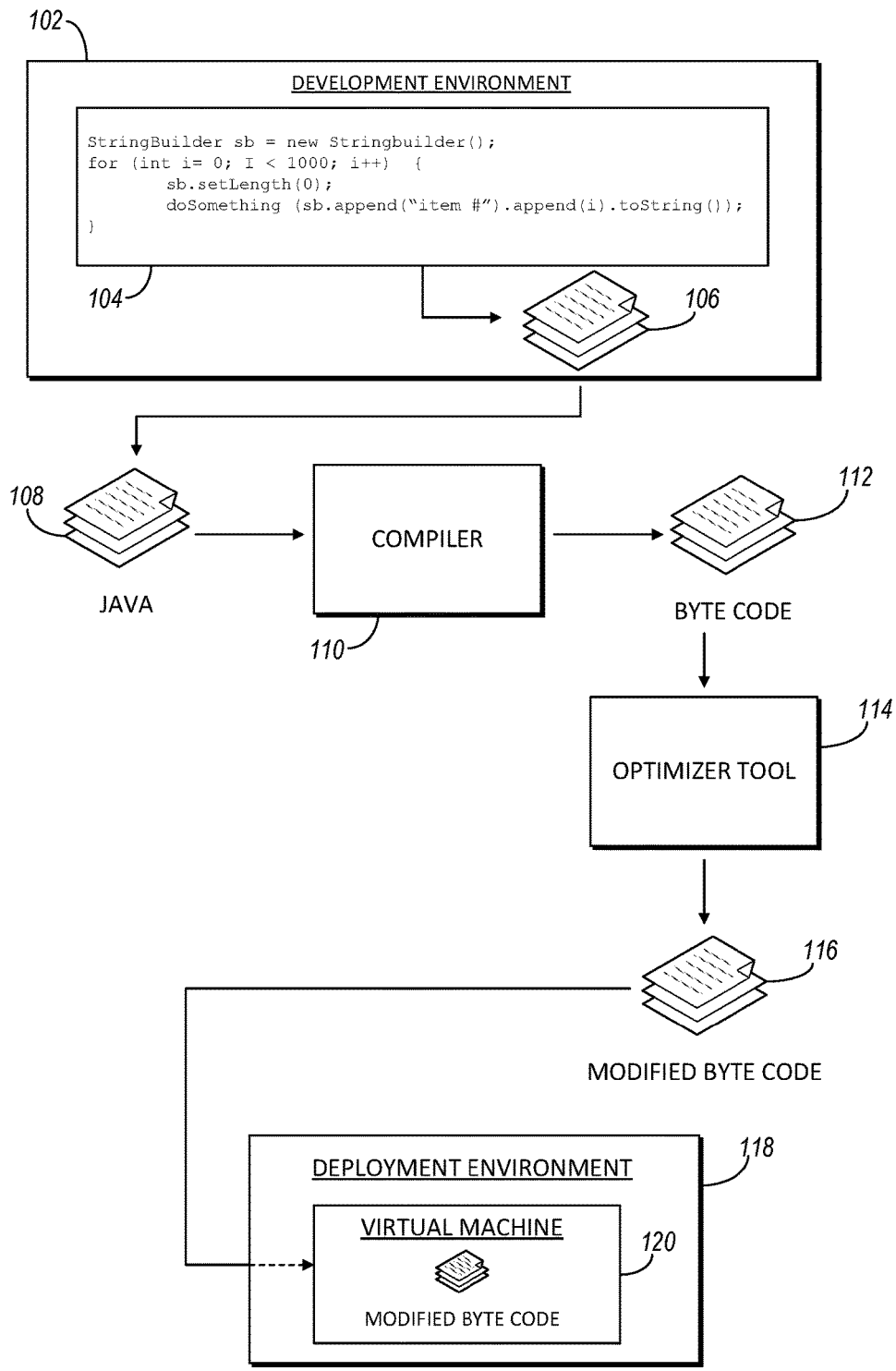
FIG. 1 is a system process flow diagram for developing, compiling, modifying, and deploying portable code that reduces string object creation, in accordance with some embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

SUMMARY

Embodiments of the invention can include a method for optimizing JAVA builds by refactoring previously complied code that includes identifying, at a device running a code building optimizer, a software program or software library that has completed a development process that has yet to be deployed on a platform or device. The method further includes searching byte code of the software program or software library for string buffer objects subject to string buffer reuse. At a plurality of points where string buffer reuse is possible as identified by the searching, the method further includes performing a modification of the byte code, such that the modification replaces a call to build a new string object with a call to an existing string object and code setting length of the existing string object to zero and appending new string characters this existing string object, wherein a modified version of the byte code, per the performing of the modification at a plurality of points, is functionally equivalent to a pre-modified version of the byte code, yet creates fewer string objects thereby improving performance of the byte code when executed by a processor.

Embodiments of the invention can further include a method for reducing memory usage due to string object creation that includes receiving, at a machine running an optimizer tool, compiled byte code which includes at least one call of a string concatenation method. The method further includes refactoring, response to running the optimizer tool at the machine, the compiled byte code to produce a modified byte code to replace the at least on-e call of the string concatenation method with a call to an existing string object and code setting length of the existing string object length to zero and appending new string characters to the existing string object. The modified byte code, when performed, is functionally equivalent to the compiled byte code with respect to string concatenation but produces fewer string objects to complete the string concatenation.

Embodiments of the invention can further include a system that is comprised of a computer including a processor and a memory in which an optimizer tool is instantiated. The optimizer tool receives compiled byte code which includes at least one call of a string concatenation method. The optimizer tool refactors the compiled byte code to produce a modified byte code to replace the at least on-e call of the string concatenation method with a call to an existing string object and code setting length of the existing string object length to zero and appending new string characters to the existing string object. The modified byte code, when performed, is functionally equivalent to the compiled byte code with respect to string concatenation but produces fewer string objects to complete the string concatenation.

DETAILED DESCRIPTION OF THE DRAWINGS

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, byte code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a system process flow diagram 100 for developing, compiling, modifying, and deploying portable code that reduces string object creation, in accordance with some embodiments. The process beings in a development environment 102 where a software application or other software object (e.g. a library) is coded in a high level portable code. The high level portable code can be Java, which is produced under the "Java" trademark by Oracle, and which is commonly used in software development, particularly for internet-related software. As used here the term "Java" refers to a source code language for a portable code and includes the trademarked version of the product using the name "Java" trademark as it exists at the time of filing this application. A portable code is a programming language that compiled to an intermediate language, such as byte code, which is in turn loaded into a virtual machine environment on the target platform. Rather than developing compilers for each different runtime environment, different virtual machine environments are designed for different platforms, and device/hardware manufactures select one of the different virtual machine environments to run on their platform.

The development environment 102 is the environment where the code is designed, specified, written, and tested prior to release for use. For example, code 104 can be written and included in a source code product 106. The code 104 can include calls to methods that create objects, such as the StringBuilder method in Java. The code 104 can be included in the source code product 106, which can be a software product such as an application program or a software library. In general, the software product 106 has been tested and is ready for release, it is released in a software package 108 that is entirely source code (i.e. Java). The software package 108 can then be compiled by a compiler 110, or in some embodiments processed by an interpreter. The compiler 110 (or interpreter) produces a byte code product 112 which can be hosted on a server for download, or distributed by other means. The byte code product can include byte code and be packaged, for example, in a Java archive file that can include security authentication elements such as digital certificates. Normally, byte code is loaded into a virtual machine environment and run. However, in order to optimize the byte code, the byte code product 112 is run through, or otherwise processed by code building optimizer, such as optimizer tool 114, to refactor the byte code. The optimizer tool 114 looks for calls to methods that create objects in the byte code, such as those resulting from StringBuilder (or StringBuffer) calls in the source code. In byte code this produces an instruction to invoke java.lang.StringBuilder(argument) in the virtual machine environment. Using the code 104 as an example, the resulting byte code will generate, for each iteration of the loop, a java.lang.StringBuilder object to hold the temporary string concatenation, a char[ ] array for each StringBuilder object, a java.lang.String object to be passed on as an argument and which is discarded when the doSomething( ) method returns and the receiving object does not hold on to the String, and a char[ ] array for each String object, although in some virtual machines the StringBuilder char arrays can be shared with the resulting String depending on the size of the array and the extent to which it is filled. Thus, for 100 iterations, there can be up to 4000 objects created, and about 2000 of those object are unnecessary. Depending on the program and the virtual machine environment all 4000 objects could be unnecessary. Considering how frequently string concatenation is used in many applications even a simple program could generate millions of unnecessary objects by simply loading the byte code product 112 into a virtual machine environment and performing the byte code.

To prevent the creation of unnecessary object related to string concatenation, the optimizer tool 114 parses the byte code in the byte code product 112 to locate instances of the java.lang.StringBuilder(String) calls and replaces them with a java.lang.StringBuilder( ) call and a setLength(0) call. To do this the optimizer tool refactors the byte code of the byte code product 112 to produce a modified byte code product 116 that includes modified or refactored byte code. The optimizer tool 114 is based on a machine which performs instruction code that parses and rewrites the byte code to with difference instructions to refactor the byte code, producing the modified byte code. The modified byte code, when run, creates fewer objects when concatenating strings than the original byte code of the byte code product 112. The modified byte code product 116 can then be provided to a deployment environment 118, which is established on one or more machines that perform the byte code in one or more processors, and which establishes a virtual machine environment 120 into which the modified byte code is loaded to be run. The deployment environment can be provided by any computing environment, including mobile devices, tablet computers, desktop computers, servers, and so on. In some embodiments the optimizer tool 114 can be instantiated on the same machine as the virtual machine environment 120, and invoked upon the machine receiving the byte code product 112. In some embodiments the optimizer tool 114 can be selectively enabled, such as by a user setting or by prompting a user to indicate whether the given byte code product being loaded should be refactored or not. In some embodiments the optimizer tool 114 can provide an indication to a user as to how many instances the java.lang.StringBuilder call will be refactored to reduce object creation. In some embodiments the optimization tool 114 can be located on a machine that is remote from the machine providing the deployment environment 118 through which the byte code product 112 can be directed and refactored to provide the modified byte code product 116. Such options allow the user to control how the application or software library, once instantiated in the virtual machine, operates with regard to object creation.

Figure 2:
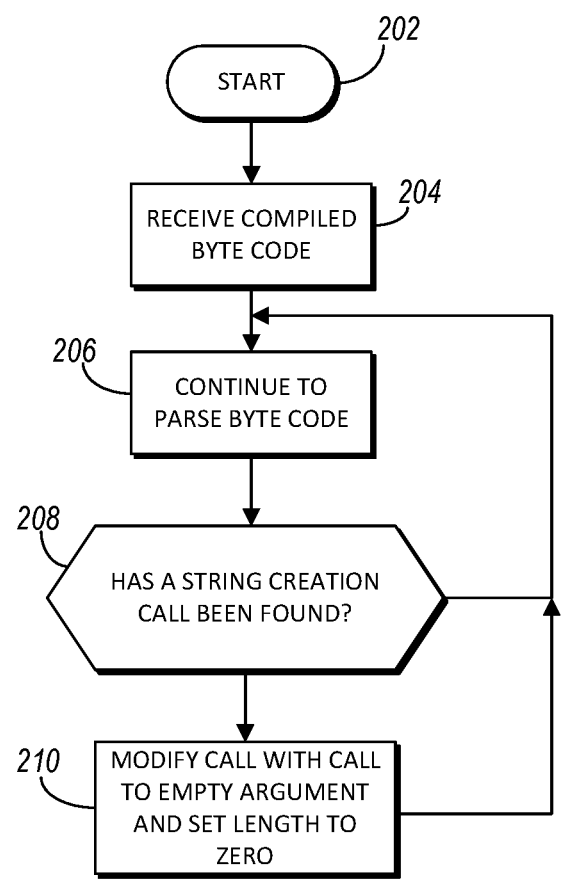
FIG. 2 is a flow chart diagram of a method for optimizing byte code to reduce string object creation, in accordance with some embodiments.

FIG. 2 is a flow chart diagram of a method 200 for optimizing byte code to reduce string object creation, in accordance with some embodiments. The method 200 can be used in the context of implementing process flow diagram 100 of FIG. 1. At the start 202 a software product written in a portable code language has been produced and compiled to produce a byte code product. In step 204 the machine on which the optimizer tool is instantiated receives the compiled byte code. The compiled byte code can be included in a Java archive file. The location of the optimizer tool can be at the device or system that will run the refactored byte code, at the machine on which the compiled byte code is located, or at an intermediate machine. When the compiled byte code is to be refactored by the optimizer tool, in step 206 the optimizer tool commences or continues to parse the complied byte code to identify instances of calls to methods that create string concatenation objects. While parsing the compiled code in step 206, step 208 can be performed. When string concatenation call is found in step 208, then it is modified in step 210. Essentially step 208 considers each instruction in the compiled byte code, line by line. If, in step 206, there is no more compiled byte code to process, the method 200 ends. Further, between steps 206, 208 the optimizer tool is constructing a new byte code file that will become the modified byte code to be included in the modified byte code product. In step 210 the compiled byte code is refactored to reduce the creation of string concatenation objects by, for example, replacing instances of the java.lang.StringBuilder(String) calls with java.lang.StringBuilder( ) and corresponding setLength(0) calls and associated byte code to effect the refactoring change. Once the method ends, the refactored byte code can be repackaged in a java archive, in some embodiments, or, directly loaded into a virtual machine in the deployment environment in some embodiments.

The method 200 can be performed by various machines at different locations relative to, and include at a target machine which provides the deployment environment. The method 200 can be invoked selectively, according to the desire of the user or users of the deployment environment. For example, prior to downloading a Java program for installation at the deployment environment, the user of the deployment environment can direct the download through a server that performs method 200 on the Java program byte code and then provides the modified, refactored byte code to the deployment environment. Similarly, the method 200 can be performed at the deployment environment prior to loading or installing the Java program at the deployment environment.

Figure 3:
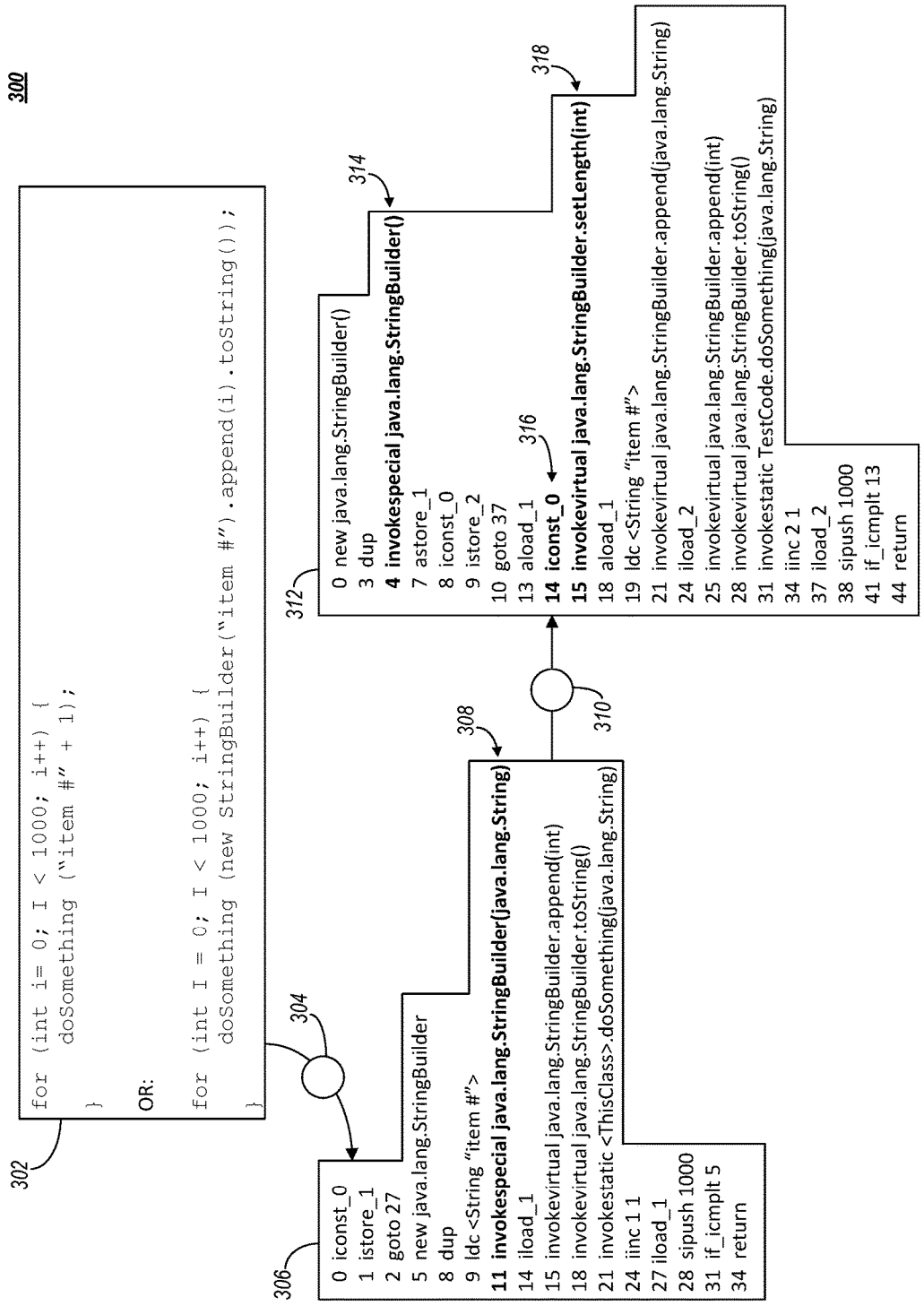
FIG. 3 show code modification from source code to optimized byte code for reducing string object creation, in accordance with some embodiments.

FIG. 3 shows a process 300 of code modification from source code 302 to optimized byte code 312 for reducing string object creation, in accordance with some embodiments. The source code 302 offers two different examples of Java source code that are equivalent. Both examples involve "do" loops set to iterate 1000 times and to build a string object in each iteration of the loop. The source code is first complied in a process 304 to produce complied byte code 306. The compiler the perform the compiling process 304 is a conventional compiler that is operated by the developer of the source code 302, for example. Accordingly, the end user may have no control over the design of the compiler, nor access to the source code 302. The compiled byte code 306 can be released by the developer of the source code 302 and made available to users for download or distributed on computer program products for installation on users' machines.

The compiled byte code 306 contains a call 308 to the java.lang.StringBuilder method with the argument of "java.lang.String." In conjunction with lines 15, 18, and 21, this method call 308 results in a java.lang.StringBuilder object, a char[ ] array for each StringBuilder object, a java.lang.String object, and a char[ ] array for each String object for each iteration of the byte code, which is 4000 objects total. These objects will persist until the garbage collection removes them, and a substantial number of them are not needed to accomplish the same string operations.

To reduce the number of string creation objects created by performing the byte code, the compiled byte code 306 is refactored in process 310 to produce optimized or modified byte code 312. The process 310 searches the compiled byte code 306 for calls of the java.lang.StringBuilder(String) method (or java.lang.StringBuffer in older versions of Java) and refactors the code to instead use the java.lang.StringBuilder( ) call 314, and it sets the length to zero using the iconst_0 instruction 316 followed by the java.lang.StringBuilder(int) instruction 318, among other changes. As a result, only 2002 objects are created by the modified byte code 312 when performed by a virtual machine. The modified code 312 is refactored or rewritten to accomplish the same end result as intended by the author of the source code, but it changes the way in which the end result is achieved. The compiler produces fewer instructions in the compiled bytecode 306, but the modified bytecode 312 produces fewer objects. Thus, the process 310 searches the compiled bytecode of the software program or software library 302 for string buffer objects subject to string buffer reuse. At points in the compiled bytecode where string buffer reuse is possible, as identified by the searching, the process 310 refactors the compiled bytecode with a modification that replaces a call to build a new string object with a call to an existing string object and code setting a length of the existing string object to zero, and appending new string characters to this existing string object. A modified version of the bytecode results which is functionally equivalent to a compiled (i.e. before process 310) bytecode. The modified bytecode produces fewer string objects, thereby improving performance of the bytecode with regard to memory usage when executed by a processor in the virtual machine of the deployment environment.

The embodiments taught herein provide the benefit of reducing the number of string objects created during string operations such as string concatenation in portable code. Most of the string object created in iterative sting concatenation, for example, are only used once, are redundant, and could be reused, but the bytecode produced by conventional Java compilers results in many unnecessary string objects which occupy memory until a garbage collection process is performed on the memory heap. By refactoring the bytecode to eliminate instructions that create string objects, and instead reusing string objects for iterative string concatenation processes, string object creation can be greatly reduced, which in turn reduces demand on memory resources.

In general, the embodiments provide the benefit of eliminating duplicate views of content items with which a user has already interacted, and therefore does not need to see again. Furthermore, they provide the benefit of prioritizing content items that are related to content items previously consumed by the user to draw the user's attention to those items. In some embodiments the web sites will be unable to determine which content items the user has previously consumed since the determination of duplicative content items that can be suppressed is performed at the client machine. In some embodiments the client machine indicates the content items that have been previously consumed by the user of the client machine, and the web site dynamically creates markup code for a rendering a view of the web site in which previously consumed content items are suppressed and which can further prioritize content items that are related to content items that have been previously consumed by the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for optimizing JAVA builds by refactoring previously complied code comprising:
   identifying, at a device running a code building optimizer, a software program or software library that has completed a development process that has yet to be deployed on a platform or device;
   searching byte code of the software program or software library for string buffer objects subject to string buffer reuse; and
   at a plurality of points where string buffer reuse is possible as identified by the searching, performing a modification of the byte code, such that the modification replaces a call to build a new string buffer object with a call to an existing string buffer object and code setting length of the existing string buffer object to zero and appending new string characters this existing string buffer object, wherein a modified version of the byte code, per the performing of the modification at a plurality of points, is functionally equivalent to a pre-modified version of the byte code, yet creates fewer string buffer and character array objects thereby improving performance of the byte code when executed by a processor.

* * * * *